Figure 1:
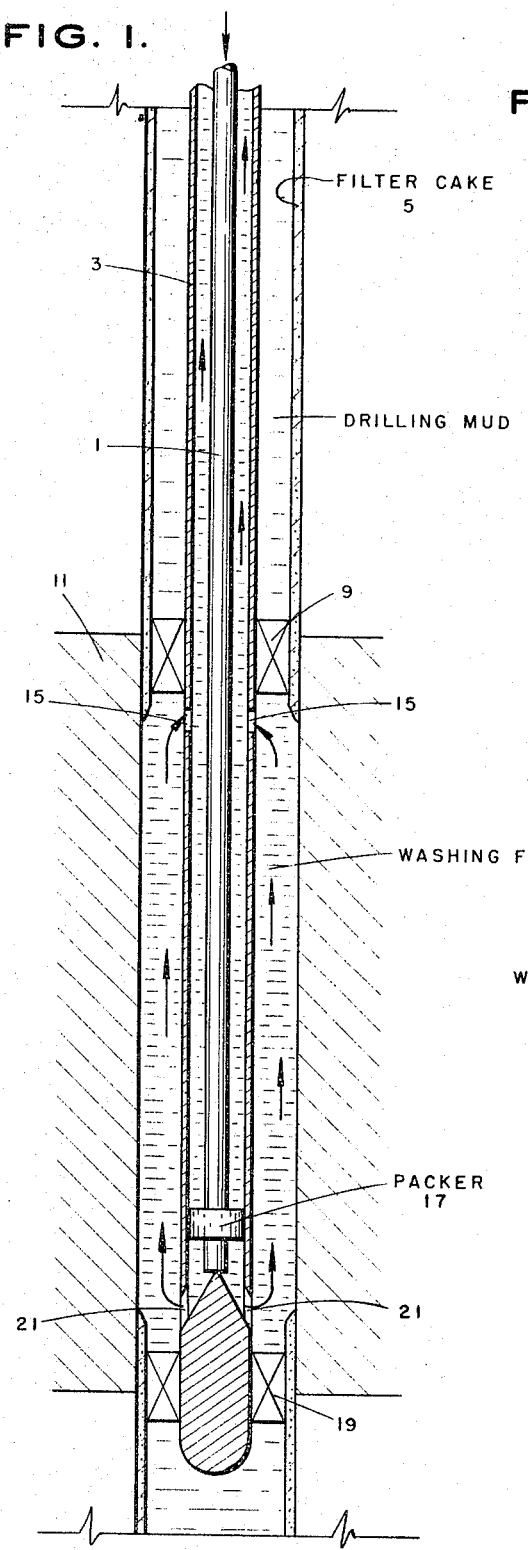

Feb. 7, 1967  F. A. SMITH ET AL  3,302,715
METHOD OF DRILLING AND COMPLETION OF WELLS IN THE
EARTH AND DRILLING FLUID THEREFOR
Filed Oct. 27, 1964

INVENTORS.
FLOYD A. SMITH,
JOSEPH W. GRAYBEAL,
MERCER H. PARKS,
BY John B. Davidson
ATTORNEY.

3,302,715
METHOD OF DRILLING AND COMPLETION OF WELLS IN THE EARTH AND DRILLING FLUID THEREFOR
Floyd A. Smith, Tulsa, Okla., and Joseph W. Graybeal, Midland, and Mercer H. Parks, Houston, Tex., assignors, by mesne assignments, to Esso Production Research Company, Houston, Tex., a corporation of Delaware
Filed Oct. 27, 1964, Ser. No. 406,840
7 Claims. (Cl. 166—25)

This invention relates to the drilling and completion of wells in the earth, and more particularly to a technique for eliminating the necessity for a casing string.

A more particular aspect of the invention relates to a novel drilling fluid.

During the course of drilling boreholes in the earth for the purpose of recovering connate fluids from given earth formations therein, it is the practice to circulate a drilling fluid down the drill string and up the annulus thereabout for the purpose of cooling the drill bit, carrying cuttings to the earth's surface, and forming a filter cake on the sides of the borehole. For the purpose of controlling the well, it is customary to adjust the weight of the drilling fluid to a value sufficient to prevent blowouts. Manifestly, the drilling fluid must have a certain amount of viscosity in order to facilitate carrying cuttings to the surface.

After the well has been drilled to a desired depth, it is also customary to set a protective casing in the well to prevent cave-ins and to cement that casing to the surrounding earth formations for the purpose of preventing fluid intrusion into the borehole from formations other than the formation from which it is desired to produce connate fluids. Inasmuch as such a casing is quite expensive, it is highly desirable to eliminate it if possible.

In accordance with one aspect of the invention, a drilling fluid is compounded to include sulfur having particle sizes in the range of 10 to 325 mesh in the amount of 1 to 50 pounds per 42-gallon barrel of drilling fluid, along with particulate agents of the earth clay type in the amount of 0 to 200 pounds per 42-gallon barrel of drilling fluid. More specifically, the drilling fluid may additionally include density and viscosity promoting agents selected from the group consisting of barites, bentonites, sub-bentonites, sand, etc., in the amount of 0 to 200 pounds per 42-gallon barrel of drilling fluid. Other compounds that may be added to the drilling fluid are thinners, fluid loss control agents, inhibitors, and all other commonly used mud treating agents.

According to another aspect of the invention, a drilling fluid compound as indicated above is used to drill a borehole into the earth through the level of a given earth formation whereby a filter cake including particulated sulfur is formed on the sides of the borehole. The filter cake on the sides of the borehole at levels therein other than the level of the given earth formation is heated to fuse the particulated sulfur in the filter cake. In accordance with a more particular aspect of the invention, at least a portion of the filter cake is removed from the sides of the borehole at the level of the given earth formation by contacting that portion of the filter cake with a solvent for sulfur so as to wash away said portion of the filter cake.

Figure 2:
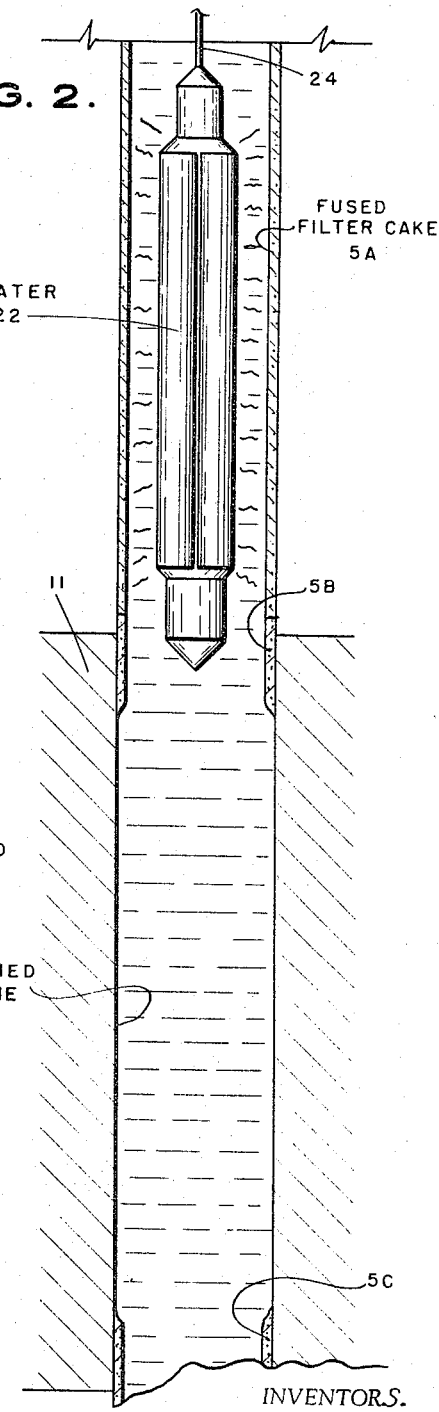

Objects and features of the invention not evident from the above description will become apparent upon consideration of the following description of the invention taken in connection with the accompanying drawing, wherein:

FIGS. 1 and 2 are cross-sectional views of a portion of a borehole and well equipment illustrating two steps in connection with the practice of the invention.

The drilling of a borehole carrying out the present invention may be done using entirely conventional equipment and following the usual rotary drilling technique. As indicated above, the drilling fluid used comprises a liquid carrier and includes particulated sulfur having particle sizes in the range of 10 to 325 mesh in the amount of 1 to 50 pounds per 42-gallon barrel of drilling fluid. The liquid carriers may be selected from the group consisting of oil, water, and mixtures thereof. The particulated sulfur acts as a weighting agent during the course of drilling of the well. In addition to the particulated sulfur, there may be added to the drilling fluid a particulated weighting agent of the earth clay group such as bentonite, sub-bentonite clays, barites, and other conventional weighting agents, in the amounts of 0 to 200 pounds per 42-gallon barrel of drilling fluid. The amount of particulated sulfur used in a given drilling fluid should be in the ratio of at least one part by weight of sulfur to four parts of the total of other weighting agents used. Manifestly, the amount of the weighting agent used in a given operation will be determined by the pressure conditions anticipated in the earth formations that the well is to penetrate. Other agents in the amounts indicated above may be added where necessary.

During the course of the drilling operation, a filter cake, designated by the reference numeral 5 in FIG. 1, will be formed on the sides of the borehole. After the borehole has penetrated an earth formation from which it is desired to produce connate fluids, indicated in the drawing as production zone 11, drilling operations may be discontinued and the drill pipe is withdrawn from the borehole. At this point it may be desired to remove the filter cake from at least a portion of the section of the borehole traversing production zone 11. For this purpose, a tubing string 3 is lowered into the borehole, the exterior surface of which string is affixed to production-type packers 9 and 19. The packers are set on the tubing string at levels sufficient to straddle the portion of the borehole from which it is desired to remove the filter cake. The packers preferably are of the type that can be expanded after they are placed at the depth at which operations are to be conducted. Into the tubing string 3 is lowered another tubing string 1 having a substantialy smaller outer diameter than the inner diameter of tubing string 3. At or near the lower end of tubing string 1 is placed packer 17 for the purpose of sealing the annulus between the two tubing strings. Tubing string 3 is provided with ports 21 near the lower end thereof immediately above packer 19. A solvent for sulfur, such as hexane, is circulated down tubing string 1 through ports 21, up the annulus between tubing string 3 and the walls of the borehole, through ports 15 located immediately below packer 9, and up the annulus between tubing strings 1 and 3. After a period of time the filter cake between packers 9 and 19 will be removed. Tubing strings 1 and 3 and the packers associated therewith thereupon may be removed from the borehole.

Thereafter, there is lowered into the borehole a borehole heater 22 which may be of construction well known to the art, such as the gas fired type or the electrically energized type. The heater, diagrammatically illustrated in FIG. 2, is assumed to be of the electrically heated type. Energy for the heater 22 may be supplied through an electrical cable 24, by means of which the heater 22 is suspended in the borehole. The heater is slowly passed through the borehole so as to raise the temperature of the filter cake to at least 250° F., at which temperature the sulfur in the filter cake will melt. After the heater has passed a particular level in the borehole, the sulfur will cool and will be fused with the other materials to form a strong, more or less glazed material that will be found to be quite effective for use in place of metallic well casing. In FIG. 2 it is assumed that the heater 22 is being slowly lowered through the borehole so that the sulfur content of the upper portion of the filter cake (designated by reference numeral 5A) is melted or fused. The portion of the filter cake above zone 11 (designated by reference numeral 5B) and below zone 11 (designated by reference numeral 5C) has not been affected by the heater, and so the sulfur content thereof remains unfused. Where it is not necessary to remove the filter cake adjacent production zone 11, the borehole heater will either be turned off while it is traversing zone 11, or will be passed through that portion of the borehole so rapidly that the sulfur content of the filter cake cannot be appreciably affected by the heater.

After the borehole heater has performed its function, it is removed from the borehole, and the production zone 11 is placed in production, preferably by using a tubing string having packers set above and below the production zone 11 so that earth fluids may flow from zone 11 through the tubing string to the earth's surface. If desired, the production zone 11 may be perforated or otherwise treated to stimulate the production of connate fluids therefrom. Such techniques may be accomplished using conventional apparatus well known to the art and will not be further discussed herein.

The filter cake formed as described above will be found to be strong and admirably adaptable as a substitute for metallic casing when the pressure of the formation fluids traversed by the borehole does not exceed the borehole pressure by more than about 100 p.s.i. Manifestly, the cost of a well installation formed in accordance with the above-described technique is substantially less than a conventional installation using metallic casing. The cost of cementing, perforating, etc., is substantially greater than the cost of fusing the filter cake and the additional cost of the sulfur in the drilling fluid.

Having described the principle of the invention and the best mode in which it is contemplated to apply that principle, it is desired that it be understood that the apparatus described is illustrative only and that other means can be employed without departing from the true scope of the invention.

What is claimed is:

1. A drilling fluid comprising:
   a liquid carrier selected from the group consisting of oil, water, and mixtures thereof;
   particulated sulfur having particle sizes in the range of 10 to 325 mesh, in the amount of 1 to 50 pounds per 42-gallon barrel of drilling fluid; and
   a particulated weighting agent in the amount of 0 to 200 pounds per 42-gallon barrel of drilling fluid.

2. The method of drilling and completing a well to recover connate fluids from a productive earth formation, comprising:
   compounding a drilling fluid including between 1 and 50 pounds of sulfur per 42-gallon barrel of drilling fluid, said sulfur being particulated in the range of 10 to 325 mesh;
   with said drilling fluid, drilling a borehole into the earth whereby a filter cake is formed on the sides of the borehole, said filter cake including said particulated sulfur; and
   heating the filter cake on the sides of the borehole to fuse the particulated sulfur in the filter cake.

3. The method of drilling and completing a well to recover connate fluids from a productive earth formation, comprising:
   compounding a drilling fluid including between 1 and 50 pounds of sulfur per 42-gallon barrel of drilling fluid, said sulfur being particulated in the range of 10 to 325 mesh;
   with said drilling fluid, drilling a borehole into the earth through the level of said earth formation whereby a filter cake is formed on the sides of the borehole, said filter cake including said particulated sulfur;
   removing at least a portion of the filter cake from the sides of the borehole at the level of said earth formation; and
   heating the filter cake on the sides of the borehole to fuse the particulated sulfur in the filter cake.

4. The method of drilling and completing a well to recover connate fluids from a productive earth formation, comprising:
   compounding a drilling fluid including between 1 and 50 pounds of sulfur per 42-gallon barrel of drilling fluid, said sulfur being particulated in the range of 10 to 325 mesh;
   with said drilling fluid, drilling a borehole into the earth whereby a filter cake is formed on the sides of the borehole, said filter cake including said particulated sulfur; and
   heating the filter cake on the sides of the borehole other than at the level of said earth formation to fuse the particulated sulfur in the filter cake.

5. The method of drilling and completing a well to recover connate fluids from a productive earth formation, comprising:
   compounding a drilling fluid including between 1 and 50 pounds of sulfur per 42-gallon barrel of drilling fluid, said sulfur being particulated in the range of 10 to 325 mesh;
   with said drilling fluid, drilling a borehole into the earth whereby a filter cake is formed on the sides of the borehole, said filter cake including said particulated sulfur; and
   lowering a borehole heater through the formation to temporarily heat the filter cake thereon other than at the level of said earth formation to melt particulated sulfur therein.

6. The method of drilling and completing a well to recover connate fluids from a productive earth formation, comprising:
   compounding a drilling fluid including between 1 and 50 pounds of sulfur per 42-gallon barrel of drilling fluid, said sulfur being particulated in the range of 10 to 325 mesh;
   with said drilling fluid, drilling a borehole into the earth whereby a filter cake is formed on the sides of the borehole, said filter cake including said particulated sulfur;
   contacting the portion of the filter cake at the level of said earth formation with solvent for sulfur to wash away said portion of said filter cake; and
   lowering a borehole heater through the formation to temporarily heat the filter cake thereon other than at the level of said earth formation to melt particulated sulfur therein.

7. The method of drilling and completing a well to recover connate fluids from a productive earth formation, comprising:
   compounding a drilling fluid including between 1 and 50 pounds of sulfur per 42-gallon barrel of drilling fluid, said sulfur being particulated in the range of 10 to 325 mesh;
   with said drilling fluid, drilling a borehole into the earth whereby a filter cake is formed on the sides of the borehole, said filter cake including said particulated sulfur;
   contacting the portion of the filter cake at the level of said earth formation with solvent for sulfur to wash away said portion of said filter cake; and
   lowering a borehole heater through the formation to temporarily heat the filter cake thereon to a temperature of at least 250° F.

(References on following page)

References Cited by the Examiner

UNITED STATES PATENTS

| | | | |
|---|---|---|---|
| 978,359 | 12/1910 | Cooper | 166—25 |
| 2,110,236 | 3/1938 | Nolan | 166—25 X |
| 2,341,573 | 2/1944 | Reed | 166—25 |
| 2,363,269 | 11/1944 | Schlumberger | 166—25 |
| 3,126,959 | 3/1964 | Ortloff | 166—25 X |

CHARLES E. O'CONNELL, *Primary Examiner.*

I. A. CALVERT, *Assistant Examiner.*